United States Patent [19]
Yamazaki et al.

[11] Patent Number: 5,539,548
[45] Date of Patent: Jul. 23, 1996

[54] ELECTRO-OPTICAL DEVICE WITH LAMINATED LAYERS OF LIQUID CRYSTAL AN LIGHT SCATTERING SUPPORT LAYERS

[75] Inventors: Shunpei Yamazaki, Tokyo; Toshiji Hamatani, Kanagawa, both of Japan

[73] Assignee: Semiconductor Energy Laboratory Co., Ltd., Kanagawa-ken, Japan

[21] Appl. No.: 310,374

[22] Filed: Sep. 22, 1994

Related U.S. Application Data

[63] Continuation of Ser. No. 957,177, Oct. 7, 1992, abandoned.

[30] Foreign Application Priority Data

Oct. 8, 1991 [JP] Japan .................... 3-290725

[51] Int. Cl.⁶ ............... G02F 1/1347; G02F 1/1341
[52] U.S. Cl. .................. 359/53; 359/62; 359/51; 359/82
[58] Field of Search .................. 359/51, 52, 53, 359/82, 62, 74, 94

[56] References Cited

U.S. PATENT DOCUMENTS

| | | | |
|---|---|---|---|
| 4,161,557 | 7/1979 | Suzuki et al. | 359/74 |
| 4,556,286 | 12/1985 | Uchida et al. | 359/53 |
| 4,581,608 | 4/1986 | Aftergut et al. | 359/51 |
| 4,842,379 | 6/1989 | Oishi et al. | 359/53 |
| 4,878,741 | 11/1989 | Fergason | 359/51 |
| 5,013,141 | 5/1991 | Sakata | 359/94 |
| 5,084,203 | 1/1992 | Sansone et al. | 359/51 |
| 5,113,272 | 5/1992 | Reamey | 359/51 |
| 5,124,819 | 6/1992 | Davis | 359/53 |
| 5,132,826 | 7/1992 | Johnson et al. | 359/53 |
| 5,227,912 | 7/1993 | Ho et al. | 359/258 |
| 5,327,271 | 7/1994 | Takeuchi et al. | 359/51 |

FOREIGN PATENT DOCUMENTS 0094822  5/1987  Japan .

*Primary Examiner*—William L. Sikes
*Assistant Examiner*—Kenneth Parker
*Attorney, Agent, or Firm*—Sixbey, Friedman, Leedom & Ferguson; Gerald J. Ferguson, Jr.; Jeffrey L. Costellia

[57] ABSTRACT

A liquid crystal electro-optical device with rough light scattering transparent support layers and a lamination structure that layers of liquid crystal material and layers of transparent support material are laminated independently in an electro-optical modulating layer portion.

18 Claims, 4 Drawing Sheets

ELECTRO-OPTICAL DEVICE WITH LAMINATED LAYERS OF LIQUID CRYSTAL AN LIGHT SCATTERING SUPPORT LAYERS

This application is a continuation of Ser. No. 07/957,177, filed Oct. 7, 1992, now abandoned.

BACKGROUND OF THE INVENTION

1. Field of the Invention

This invention relates to a dispersion the liquid crystal electro-optical device having a liquid crystal—resin complex of a primer resin and a liquid crystal material or a liquid crystal—resin complex in which resin is dispersed in liquid crystal material.

2. Description of Related Art

TN type or STN type electro-optical device using a nematic liquid crystal or the like has been well known and practically used as a liquid crystal electro-optical device. Recently, a device using ferroelectric liquid crystal is also known. In these electro-optical liquid crystal devices, basically, liquid crystal compound is kept in between a first substrate having an electrode and a lead thereon, and a second substrate having an electrode and a lead thereon. Through the electrodes on the substrate, an electric field is applied to the liquid crystal compound, and a state of the liquid crystal molecules is varied by anisotropy of a dielectric constant of a liquid crystal material itself or spontaneous polarization when the liquid crystal is formed of ferroelectric liquid crystal. Consequently, an electro-optical effect which is induced by the variation of the state of liquid crystal molecules is utilized.

In a TN or STN type liquid crystal electro-optical device, liquid crystal molecules are oriented along a rubbing direction on the contact surface between a liquid crystal layer and each of the substrates by a restricting force which is induced by a rubbing carried out for an orientation treatment. The rubbing directions on the upper and lower substrates are deviated from each other by an angle of 90° or 200°–290°. The liquid crystal molecules at the center portion of the liquid crystal layer are aligned spirally between the upper and lower molecules which are located with angular deviation from 90° to 200°–290° so that an energy is minimum. In this case, chiral material is mixed into the liquid crystal material in the STN type if an occasion demands.

All of these device have a polarizer and requires the liquid crystal molecules to be regularly oriented along a fixed direction in a liquid crystal electro-optical device. This orientation treatment is carried out by rubbing an orientation film (an organic film in a usual case) in a fixed direction with cotton or velvet cloth. If no orientation treatment is conducted, the liquid crystal molecules would not be oriented in the fixed direction, and thus the electro-optical effect of liquid crystal can not be utilized. Thus, the device is designed in a vessel structure in which liquid crystal material is kept by a pair of substrates, and the liquid crystal is injected into the vessel and oriented to utilize the optic effect of the injected liquid crystal.

On the other hand, there has been known a dispersion type liquid crystal which requires no polarizer and no orientation treatment and provides a bright and high-contrast screen. This dispersion type liquid crystal is constructed such that transparent solid-state polymer keeps liquid crystal material in a granular or sponge form to form an electro-optical modulating layer. Conversely, another type is constructed such that a solid-state polymer is dispersed in liquid crystal material and the liquid crystal material is oriented uniformly and randomly. As a method of producing this liquid crystal device has been known a method in which encapsulized liquid crystal material is dispersed in polymer, and the polymer is formed in the form of a film or in the form of a thin film on a substrate. Here, Arabic rubber, polyvinyl alcohol, gelatin or the like is used as capsulizing material.

For example, liquid crystal molecules capsulized by polyvinyl alcohol are oriented under electric field such that the long axis thereof is parallel to the electric field if the liquid crystal molecules have positive dielectric anisotropy in a thin film, and transparency appears when refractive index of polymer is equal to refractive index of liquid crystal. On the other hand, since under no electric fields the liquid crystal molecules do not orient in a specific direction, but orient in various directions, a difference between refractive index of liquid crystal and refractive index of polymer becomes large, so that incident light is scattered and light transmission is prevented, and an opaque state appears, Various informations are presented by utilizing this difference between the transparent state and the opaque state. In addition to the encapsulated liquid crystal, a type that liquid crystal material is dispersed in epoxy resin, a type that liquid crystal and a photocuring resin are mixed with each other and light is irradiated to photocure the resin and utilize a phase separation between the liquid crystal and the resin, and a type that liquid crystal is absorbed into three-dimensionally linked polymers, have been known as a dispersion type of liquid crystal. In this invention, these are commonly referred to as "dispersion type liquid crystal".

In this dispersion type liquid crystal electro-optical device, light transmittance of the liquid crystal electro-optical device is markedly high in comparison with the conventional TN and STN type electro-optical device because no polarizer is used. Specifically, the permeability of one polarizer is about 50%, and for an active matrix using these polarizers in combination, only about 1% of light can transmit. The permeability of the STN type is about 20%. Therefore, in these cases, an effort for heightening the brightness of a screen by increasing intensity of illumination of back light has been made. On the other hand, over 50% of light transmits in the dispersion type liquid crystal electro-optical device. This is a superiority of the dispersion type of liquid crystal owing to no use of polarizer.

As mentioned above, the dispersion type liquid crystal is used between the transparent state and the opaque state, and it has been ordinarily researched and developed as being used for the transmission type liquid crystal electro-optical device because amount of light transmitting through a liquid crystal electro-optical device is large. Of the transparent types, it has been developed particularly as being used for a projection type liquid crystal electro-optical device. This projection type liquid crystal electro-optical device is so constructed that a liquid crystal electro-optical device panel is placed in a light path of light emitted from a light source and the light transmitted through the panel is projected on a wall surface through a slit having a fixed angle. Liquid crystal molecules in the panel orient in various directions in a low electric field region below a threshold value where the liquid crystal dose not respond to an applied voltage, and thus the panel is in an opaque state.

The light incident to the panel at this time is scattered after transmission through the panel, and the light path of the incident light is broadened. Therefore, the scattered light is cut off by the slit which is placed at a next stage, so that the light hardly reaches the wall surface and a dark state is obtained. On the other hand, when the liquid crystal responds to the applied voltage and liquid crystal molecules orient in parallel to the electric field, the incident light transmits straightly through the panel without being scattered and thus a light state of high brightness is obtained on the wall surface.

In these dispersion types of liquid crystal electro-optical devices, since a display contrast is dependent on a degree of scattering of the incident light which is based on variation of the orientation state of the liquid crystal material, it is required to keep the liquid crystal material in a fine-droplet state in the device. The dimension of the droplet is set to 10 microns at the maximum and 0.05 micron at the minimum, and is set to 0.3–3 microns usually.

In the dispersion type liquid crystal electro-optical device, the scattering and straight transmission of light due to this fine droplet are utilized, so that it is required to form droplets having uniform size over the liquid crystal electro-optical device. However, it has been very difficult to uniformly form such fine droplets of liquid crystal over the substrate of the liquid crystal electro-optical device.

That is, as a method of forming fine droplets of liquid crystal has been mainly utilized a phase separation method that liquid crystal material and resin material are mixed and then the resin material is cured, or a method that liquid crystal material and resin material are mixed and then is subjected to a capsulization treatment through reaction in liquid phase or the like. However, both of the methods depend on the curing characteristics of the resin material and the like, and thus it is difficult to form the droplets in uniform size.

SUMMARY OF THE INVENTION

An object of this invention is to provided a method of forming fine and uniform liquid crystal droplets at low cost and with a simple process, and a novel liquid crystal electro-optical device for implementing the method.

Namely, a liquid crystal electro-optical device according to one aspect of this invention is characterized by having a structure where a plurality of layers of liquid crystal material and transparent supporter are laminated independently of one another in an electro-optical modulating layer. With the structure having a plurality of liquid crystal layers alternating with a transparent support layer in the electro-optical modulating layer as described above, the same function as a dispersion type liquid crystal electro-optical device in which liquid crystal material is dispersed in transparent resin material to form fine liquid crystal droplets can be obtained.

DETAILED DESCRIPTION OF THE PREFERRED EMBODIMENT

Figure 1:
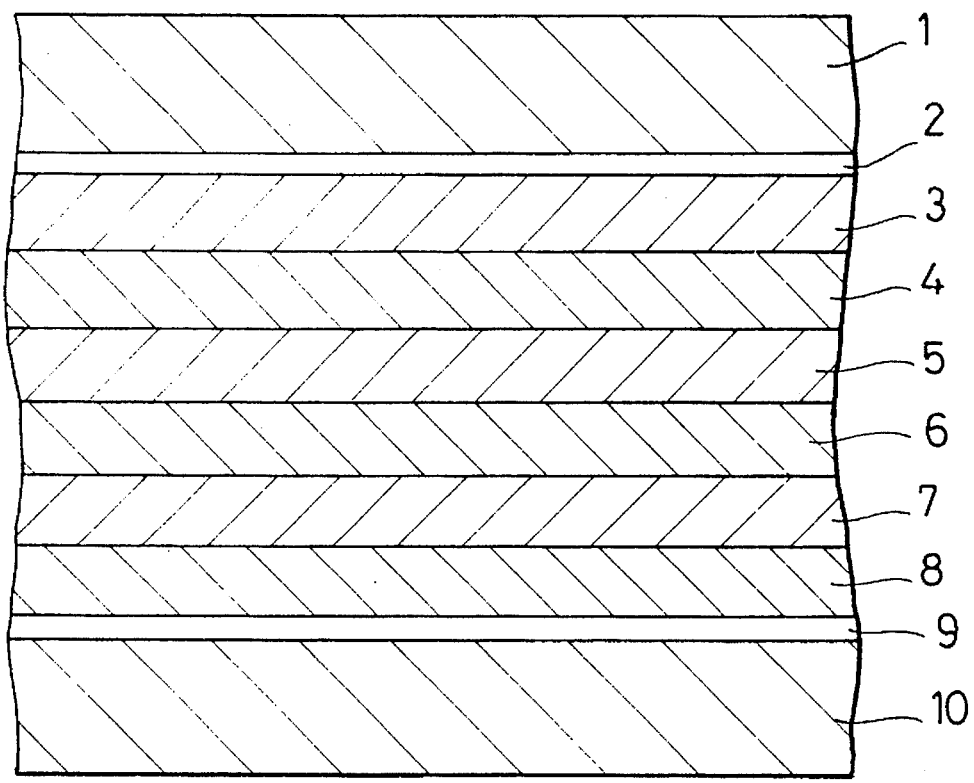
FIG. 1 is a cross-sectional view of an embodiment of a liquid crystal electro-optical device of this invention.

FIG. 1 is a cross-sectional view of a liquid crystal electro-optical device according to this invention. Liquid crystal layers 3, 5, and 7, and transparent support layers 4, 6 and 8 are alternately laminated on an electrode 2 formed on a substrate 1 to form an electro-optical modulating layer.

In this figure, the liquid crystal layers and the transparent support layers are illustrated such that the thicknesses thereof are equal to each other. However, the thicknesses thereof are not necessarily indispensable, and these layers are formed by adjusting the thickness of the liquid crystal layers and the thickness of the transparent support layers in accordance with desired characteristics.

The thickness of the liquid crystal layer is in a range from 0.3 to 5 microns (μm), and preferably in a range of 0.5 to 3 microns. In the preferable range, light incident into the liquid crystal electro-optical device can be sufficiently scattered. In the liquid crystal electro-optical device of this invention, unlike the conventional dispersion type liquid crystal electro-optical device, formation of a liquid crystal part suitable for light scattering can be implemented, not by forming fine liquid crystal droplets, but by adjusting the thickness of the liquid crystal layer.

The adjustment of the thickness of the liquid crystal layer can be more easily performed in comparison with the effort for forming the fine and uniform liquid crystal droplets, and the liquid crystal layer can be uniformly formed on a substrate having large area.

Further, with the structure of this invention, the liquid crystal layers are separated from each other through the transparent support layer, and thus various kinds of liquid crystal materials can be used for one liquid crystal electro-optical device.

Here, "various kinds of liquid crystal materials" means those materials whose physical characteristics are different from each other so that stable orientations of the liquid crystal materials are completely different, such as nematic liquid crystal and smectic liquid crystal, or those materials whose driving threshold values are different although they are formed of same nematic liquid crystal, or combination of the above materials.

In the liquid crystal electro-optical device of this invention or a well-known dispersion type liquid crystal electro-optical device, an orientation treatment for the liquid crystal material is not usually carried out, however, the liquid crystal molecules trend in a specific direction because the liquid crystal material has a characteristic that the whole system thereof trends to be transferred to a stable state having lower inner energy. Therefore, although the liquid crystal molecules apparently seems to be oriented randomly, they have a specific inclination. Thus, there occurs a case where the scattering of light is insufficient. Even in such a case, by using various kinds of liquid crystal materials, for example, a nematic liquid crystal layer and a smectic liquid crystal layer, an effect of achieving sufficient light scattering can be obtained because these materials have different inherent characteristics.

In a case where liquid crystal materials having different driving threshold voltages are used, there exist in the liquid crystal electro-optical device both of a liquid crystal layer which transmits light straightly without scattering the light and a liquid crystal layer which scatters light when a certain voltage is applied between the electrodes of the liquid crystal electro-optical device, so that a degree of light scattering can be varied by using the difference between the driving threshold voltages to perform a gradation display.

According to another aspect of this invention, a liquid crystal electro-optical device has a structure that a plurality of layers each formed of a mixture of liquid crystal material and transparent support material are laminated on one another to form an electro-optical modulating layer. In this case, the device has partially the same structure as the conventional dispersion type liquid crystal electro-optical device, that is, the liquid crystal is dispersed in the transparent support in the device according to the another aspect of this invention, however, there is a great difference in the point that the electro-optical modulating layer is formed by laminating plural mixture layers. That is, by freely adjusting the thickness of each layer in a range of 0.3 to 5 microns, preferably 0.5 to 3 microns like the invention as mentioned above, formation of the liquid crystal part which can be easily achieved and is suitable for the light scattering can be performed, not by forming the fine liquid crystal droplets, but by controlling the thickness of liquid crystal layer.

The adjustment of the thickness of the liquid crystal layer can be more easily controlled in comparison with an effort for forming the fine and uniform liquid crystal droplets, so that the liquid crystal layer can be uniformly formed on a substrate having a large area.

Figure 2:
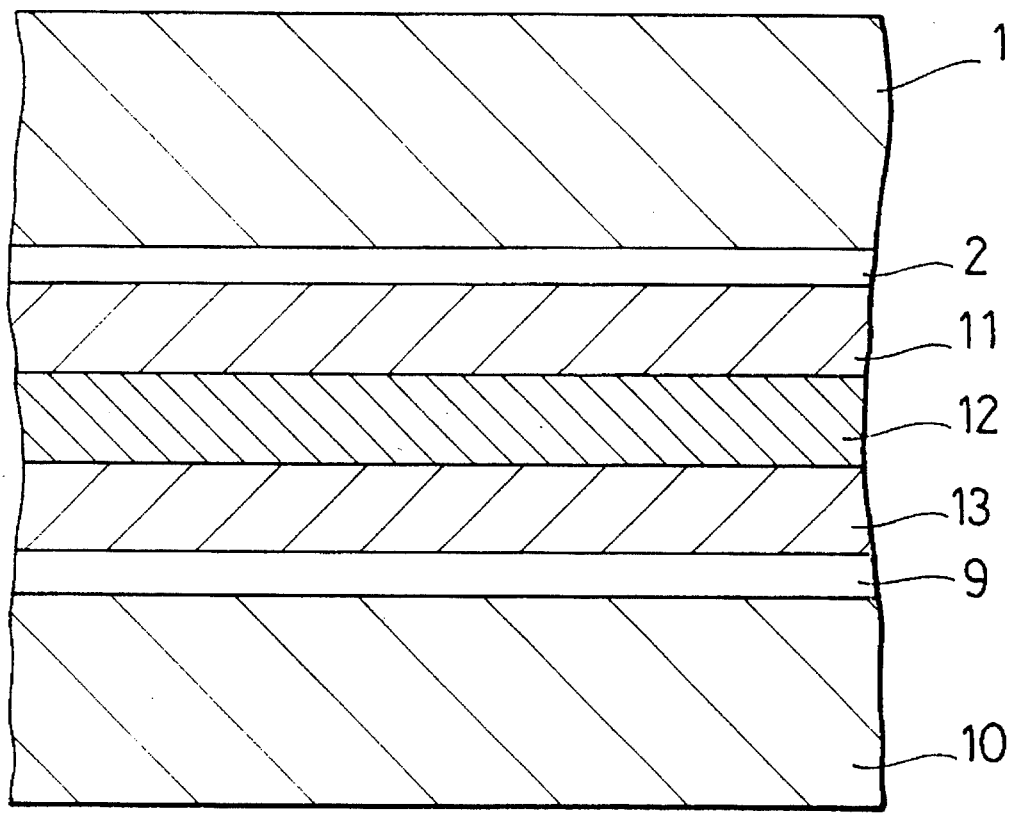
FIG. 2 is a cross-sectional view of another embodiment of the liquid crystal electro-optical device of this invention.

FIG. 2 is a cross-sectional view of the liquid crystal electro-optical device of this invention. In the figure, an electro-optical modulating layer which comprises layers 11, 12 and 13 as described below is formed between an electrode 2 on a substrate 1 and an electrode 9 on a substrate 10. The electro-optical modulating layer is formed by laminating mixture layers 11, 12 and 13 of liquid crystal material and transparent support material.

Here, when various kinds of liquid crystal materials are mixed with the transparent support material, for example one of the plurality of layers comprises a liquid crystal different than another one of the plurality of layers, the sufficient light scattering and the gradation display can be achieved like the invention according to the first aspect. However, unlike the invention according to the first aspect, this invention according to the second aspect is characterized in that incident light is scattered more sufficiently in each mixture layer because the liquid crystal material is dispersed in the mixture layer.

Plural novel methods can be proposed as a method of producing the liquid crystal electro-optical device having the novel structure as described above.

A first method is a method that liquid crystal material layers and transparent supporter layers are alternately laminated, and when a desired electro-optical modulating layer is fabricated, the whole transparent support material are cured (hardened) to thereby complete the formation of the electro-optical modulating layer. The curing (hardening) of the transparent support material can be carried out by irradiating a light to the transparent support material after forming a plurality of layers comprising a liquid crystal and a transparent support material. This method is the simplest and low cost production method.

A second method is a method that a liquid crystal layer and a transparent support layer are laminated on an electrode and then the transparent support layer is cured, and thereafter another liquid crystal layer and another transparent support layer are laminated again on the previously-laminated layers and then the transparent support layer is cured, or a method that a mixture layer of liquid crystal material and transparent support material is formed on an electrode and then the transparent support material is cured, and thereafter another mixture layer of liquid crystal material and transparent support material is formed again on the previously-formed mixture later and then the transparent support material is cured. That is, a pair of one liquid crystal layer and one transparent support layer, or a mixture layer of liquid crystal material and transparent support layer is considered as one unit, and after one unit is formed and cured, a next one unit is formed and cured on the previous one unit. This process is repeated until a desired electro-optical modulating layer is designed. The step of forming a liquid crystal layer and a transparent support layer alternating with the liquid crystal layer is repeated, or the step of forming a layer comprising a mixture of a liquid crystal and a transparent support by mixing a liquid crystal and a transparent support material and subsequently forming a layer thereof and subsequently hardening the transparent support material is repeated.

In this producing method, the curing treatment is conducted on the transparent support layer or material every one unit, and thus various kinds of liquid crystal materials having different characteristics can be used for one liquid crystal electro-optical device without being mixed with one another. Therefore, the sufficient light scattering and the gradation display as mentioned above can be achieved.

Means and method of forming the liquid crystal layer and the transparent support layer, or a mixture layer of liquid crystal material and transparent supporter material will be described hereunder.

A printing method can be used as a forming method available in this invention. Since these materials are in a liquid state or a paste state having low viscosity, a screen printing method, a relief-printing method, a gravure method or the like can be easily adopted. In this case, by altering a printing condition, the thickness of each layer can be easily adjusted, and the layers can be formed on a substrate having a large area.

As another method may be adopted a solution coating method such as a roll coat, a spin coat or a dip coat, or a physical thin film forming method such as a sputtering method, a vacuum evaporation method, a laser sublimation method. Particularly when the physical thin film forming method is adopted, the thickness control can be performed with higher accuracy, the number of laminated layers can be increased, and light can be scattered more greatly. In this case, resin material which is not in a solution state but in a solid state can be used as the transparent support material, so that material selection can be broadened.

When the solution coating method or the printing method is adopted, by controlling the viscosity of the liquid crystal material or the transparent support material to facilitate the control of the thickness of a formed film, or by adding low boiling point alcohol to these materials to lower the viscosity of the solution, a desired thickness can be obtained.

Referring to the printing method, after a layer is printed and transferred, the surface of the layer has fine unevenness. In a normal printing process, a leveling time is required to smooth the unevenness of the surface of the layer, however, this invention dose not require this leveling process, and the unevenness is left as it is and utilized.

That is, an interface between the layers is made roughened. Light is more greatly scattered by this toughened surface. A remarkable roughened can be obtained particularly by the screen printing method.

In FIG. 1, a schematic diagram is used for the description, and of course the shape and dimension of the device as illustrated in the figure are not identical to those of an actual one.

In FIG. 1, a schematic diagram showing the liquid crystal electro-optical device having only the electrodes 2 and 9 formed on the substrate is used. However. In addition to the formation of an electrode on one of the substrates, it may be adopted to form a M-I-M type non-linear element where metal an insulator and a metal layer are laminated, or it may be adopted to form a thin film transistor, or the device may be an active type liquid crystal electro-optical device.

Ordinarily, the steepness of a transmission intensity characteristic of a dispersion type liquid crystal when voltage is applied thereto is not good, and thus it is difficult to directly apply a matrix driving using many electrodes to the dispersion type liquid crystal. Thus, it is more favorable to aid the driving by providing a non-linear element or a thin film transistor. Consequently, the insufficient steepness of the liquid crystal side can be compensated. Namely, a scattering state and a transparent state can be formed on each picture element independently under the matrix driving.

In the liquid crystal electro-optical device according to this invention, nematic, smectic, cholesteric, etc. which are generally well used can be used as the liquid crystal material. In the above description, the transparent support material is not required to be transparent to lights of all wavelengths, and those materials which have transmittance of at least 50% to light of wavelength usable for the liquid crystal electro-optical device can be also utilized, of course.

The transparent support material is not required to be resin, and inorganic material, another organic material or natural thing can be used insofar as it can support liquid crystal.

EXAMPLE 1

FIGS. 3(A) to 3(E) show processes of a method of producing a liquid crystal electro-optical device of this invention.

As shown in FIG.3, Indium-Tin-Oxide (ITO) 2 which has transparent and electroconductive property was formed in thickness of 500 to 2000 Å on a first substrate 1 by a well-known vacuum evaporation method or sputtering method. A sheet resistance at this time was measured to be from 20 to 200 ohm/cm$^2$.

Figure 3A:
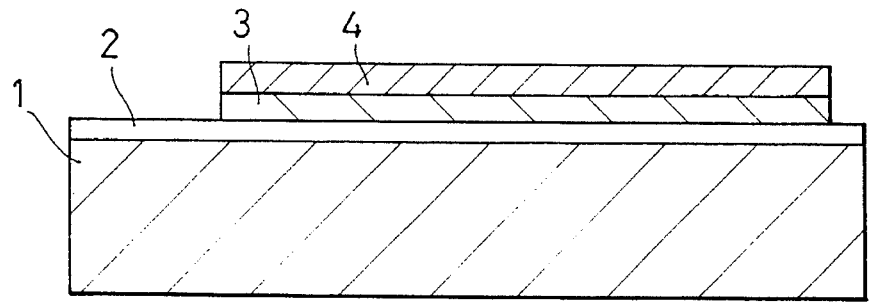
FIG. 3a–e are schematic diagram of processes of a method for producing the liquid crystal electro-optical device of this invention.
Figure 3B:
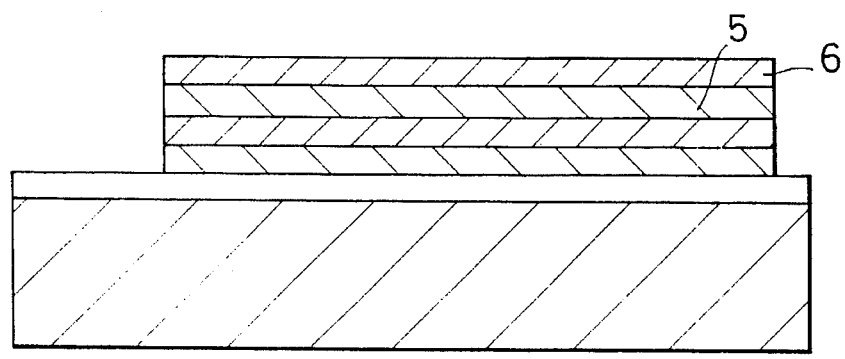
Figure 3C:
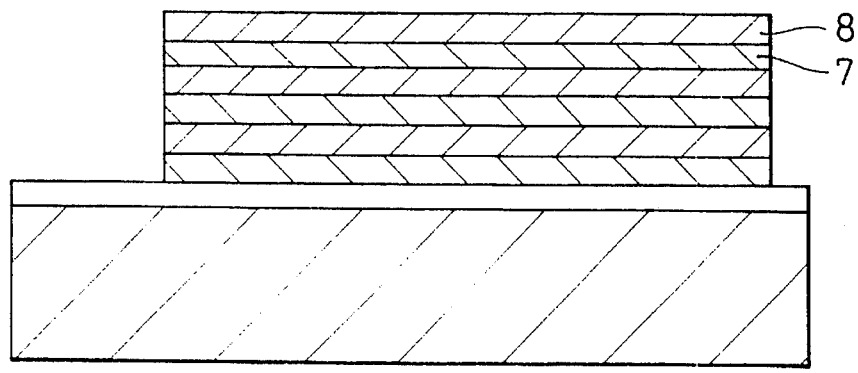
Figure 3D:
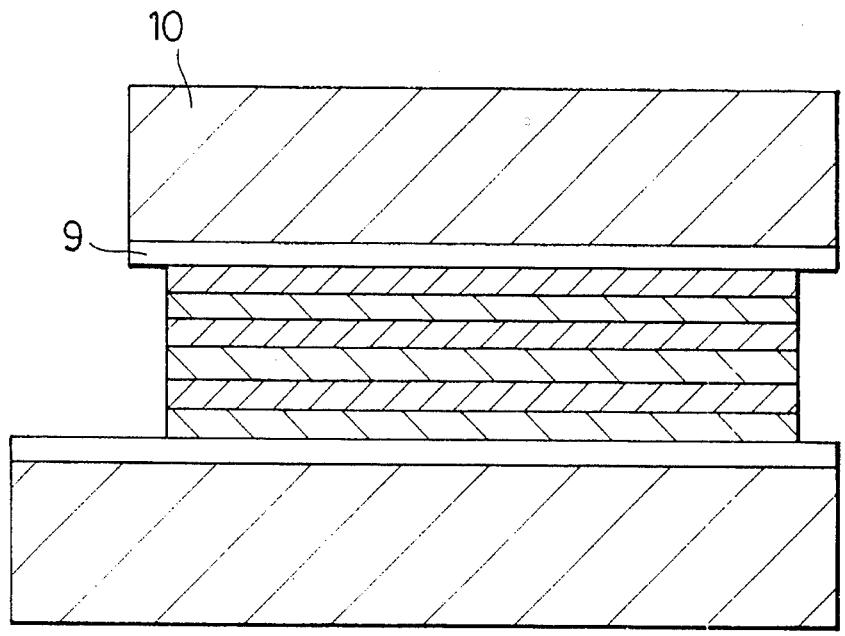
Figure 3E:
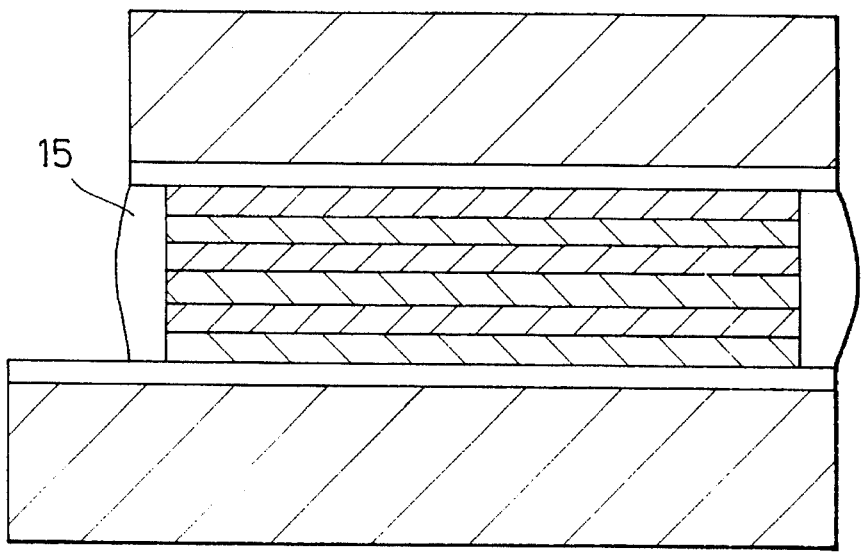

A liquid crystal layer 3 whose thickness is about 2 microns and a support layer 4 whose thickness is about 1 micron were formed on this electrode. At this time, these layers were formed by the screen printing method, and after the layer formation using the screen printing method, without taking a leveling time for the unevenness of the surface, the transparent support layer 4 is cured by irradiating ultraviolet light onto the whole surface of the substrate in a state where the uneven shape of the transparent support layer 4 was left, whereby a state as shown in FIG. 3(A) was obtained.

Next, a liquid crystal layer 3 and a transparent support layer 6, and then a liquid crystal layer 7 and a transparent support layer 8 were formed in the same manner as described above. Before curing the last transparent support layer 8, a substrate 10 having a second electrode 9 was placed on a transparent support layer 8 and is irradiated with ultraviolet light go attach the substrate to the layer 8 simultaneously, and then a state as shown in FIG. 3 (D) was obtained.

In this case, cyanobiphenyl nematic liquid crystal whose refractive index is 1.582 and Δn is 0.240 was used as liquid crystal, and in order to form 2-micron thickness layer easily, an environmental temperature around a printing machine was raised to a temperature higher than a room temperature by 10° to 30° C. (by 20° C. in this embodiment) so that viscosity of liquid crystal material was reduced.

Photocurable resin was used as the transparent support layer, and a mixture of urethane-group oligomer and acrylic-group monomer whose refractive index is 1.573 was used.

The transparent support layer was cured under a condition of irradiation of ultraviolet light that UV irradiation intensity was set to about 10 to 100 mW/cm$^2$ and irradiation time was set to about 30 to 300 sec.

Next, after forming and coating the same resin as the transparent support layer as described above at the circumference of the electro-optical modulating layer and between the upper and lower substrates, ultraviolet light was irradiated under the same condition to perform a sealing of the circumference of the electro-optical modulating layer and attachment of the substrates, and the liquid crystal electro-optical device in a state as shown In FIG. 3 (E) was completed.

In order to estimate characteristics of the liquid crystal electro-optical device of this embodiment, a conventional phase separation type dispersion type liquid crystal electro-optical device and a liquid crystal electro-optical device which comprises the same construction as this embodiment and for which the leveling treatment is conducted on the unevenness of the surface of the transparent support layer in its production process were compared.

In the liquid crystal electro-optical device of this embodiment, its transmittance was 0.1 to 0.3%, when a voltage below 3.4 volts corresponding to a threshold voltage was applied. The maximum transmittance from 75 to 85% was realized when a voltage of 15 volt was applied. Further, 16-level gradations display was obtained by changing an applied voltage. Here, the "transmittance" means a substitute value corresponding to a measured luminance value on a projection surface when the liquid crystal electro-optical device of this embodiment is used in the same manner as a projection type liquid crystal electro-optical device. Here, luminance of the projection surface when the liquid crystal panel is not placed in the light path between a light source and the projection surface is assumed as transmittance of 100%.

On the other hand, in the conventional liquid crystal electro-optical device, transmittance is 2 to 10% when an applied voltage was below the threshold value, and the maximum transmittance of 75 to 85% was obtainable when the applied voltage was over the threshold value. Likewise, in a liquid crystal electro-optical device having the same structure as this embodiment, but no uneven surface, the transmittance was 2 to 10% when the applied voltage was below the threshold value.

As described above, when the surface of the transparent support layer is roughened in the production process as adopted in this embodiment, the degree of the light scattering can be raised in a state where the liquid crystal molecules are not moved, and thus the sufficient display contrast can be realized.

EXAMPLE 2

In this embodiment, the liquid crystal electro-optical device having the structure as shown in FIG. 2 was produced. The structure as shown in FIG. 2. was produced by forming plural electro-optical modulating layers each of which comprises a mixture layer of liquid crystal material and transparent supporter.

In a production process, a mixture layer (11) whose thickness is 2.5 micron was formed on an electrode (2) of a first substrate (1) by the screen printing method, similarly in the embodiment 1. Thereafter, this mixture layer (11) was cured by ultraviolet light irradiation in the same manner as described above to complete formation of the mixture layer (11).

Next, other mixture layers (12) and (13) were likewise formed by the printing method and curing these layers on the mixture layer (11). Before curing the last mixture layer (13), a second substrate (10) was placed on the mixture layer, and was irradiated with ultraviolet light to simultaneously cure the mixture layer and attach the mixture layer to the substrate.

At this time, the roughened surface (uneven surface) may be formed like the embodiment 1 as a surface of the mixture layer.

In this embodiment, cyanobiphenyl nematic liquid crystal whose refractive index is 1.582 and $\Delta n$ is 0.240 was used as liquid crystal, and mixture of urethane-group oligomer and acrylic-group monomer whose refractive index is 1.573 was used as photocurable resin, and they were printed and formed on the substrate as a mixture. A mixing rate of the above elements in this embodiment was that the liquid crystal: monomer was 85: 35 in weight, and at this mixing rate, nematic—isotropic (N-I) phase transition temperature was about 40° C.

A mixture layer which was printed and formed at a higher temperature than the N-I phase transition temperature of a liquid crystal mixing system was kept under ultraviolet light irradiation having irradiation intensity of about 10 to 100 mW/cm$^2$ for about 30 to 300 sec, whereby the resin was cured while the phase separation of the liquid crystal and resin were induced.

When a voltage below the threshold voltage was applied to the liquid crystal electro-optical device as described above, transmittance below 2% was obtained, so that light was scattered sufficiently and sufficient display contrast was realized.

EXAMPLE 3

The liquid crystal electro-optical device of this embodiment had the same structure as the embodiment 1 and is formed by the same process as the embodiment 1, but a different kind of liquid crystal material from that of the embodiment 1 was used.

Namely, as the liquid crystal material for the liquid crystal layer (3) and (7) in FIG. 1 was used cyanobiphenyl nematic liquid crystal whose refractive index is 1.582 and $\Delta n$ is 0.240, and as the liquid crystal material for the liquid crystal layer (5) in FIG. 1 was used ester-group smectic liquid crystal whose refractive index is substantially equal to about 1.6.

In this invention, since the rubbing treatment of the interface portion in contact with the liquid crystal layer was not conducted unlike the conventional liquid crystal electro-optical device, the liquid crystal molecules of the liquid crystal materials in the respective layers have different orientation states in accordance with characteristics of the liquid crystal materials, so that when the applied voltage was below the threshold voltage, light transmitting through the liquid crystal electro-optical device of this invention was scattered more greatly, and sufficiently low transmittance of (1%) was obtained.

EXAMPLE 4

The liquid crystal electro-optical device of this embodiment has the same structure as the embodiment 2 and was formed in the same process as the embodiment 2, but liquid crystal materials having a different characteristic was used.

Namely, as the liquid crystal material for the mixture layers (11) (12) and (13) was used cyanobiphenyl nematic liquid crystal whose refractive index was 1.582 and $\Delta n$ is 0.240, and as the photocurable resin was used mixture of urethane-group oligomer and acrylic-group monomer whose refractive index is 1.573. The liquid crystal material in the mixture layers (11) and (13) and the liquid crystal material in the mixture layer (12) were essentially the same material, but blend rates thereof were varied to obtain different characteristics of a driving threshold voltage between the liquid crystal materials, for example, to obtain 5 to 7 V for the former 6 to 8 V, for the latter. Thus, by applying a voltage from 5 to 8 V, an orientation rate (degree) of the liquid crystal molecules which will be aligned in a direction of applied electric field can be easily varied, so that the gradation display can be performed In the embodiments as mentioned above, the screen printing method was mainly used as a method for forming a layer. However, the layer forming method is not limited to the screen printing method, and other methods may be used. Especially when solid-state resin was used as raw material for resin material, a thin film forming technology such as the sputtering or the like can be utilized, so that more precise thickness control is possible.

As a sealing technology of the circumference of an electro-optical modulating layer was used a resin sealing. However, the sealing technology is not limited to the resin sealing, and a sealing method in which the circumference of a liquid crystal electro-optical device is sealed by a film using a laminate method may be utilized.

With the construction of this invention, the dimension of a liquid crystal layer of a dispersion type liquid crystal electro-optical device can be controlled so as to be designed to the extent that the sufficient scattering effect can be obtained. Thus, the size of dispersion droplets of liquid crystal material can be designed to be near to the ideal size, and high display contrast can be realized.

Further, since low cost printing method can be adopted, a liquid crystal electro-optical device using a substrate having a large area can be presented at low cost.

Still further, since a polarizer is not used, a liquid crystal display whose light loss is low and display contrast is very high can be realized.

Still further, since various kinds of liquid crystal materials can be used for one liquid crystal electro-optical device, light is scattered sufficiently and more excellent gradation display can be performed.

The electro-optical device according to the present invention con be formed by the steps of:

forming a layer of a first liquid crystal and a transparent support layer by forming a layer of said first liquid crystal and a layer of a transparent support material and subsequently hardening said transparent support material; and forming a layer of a second liquid crystal different from said first liquid crystal and a transparent support layer by forming a layer of said second liquid crystal and a layer of a transparent support material and subsequently hardening said transparent support material. The first liquid crystal may have a threshold voltage different than the second liquid crystal.

The electro-optical device according to the present invention can be formed by the steps of:

forming a layer comprising a mixture of a first liquid crystal and a transparent support material by mixing said first liquid crystal and said transparent support material, subsequently forming a film thereof, and subsequently hardening said transparent support material; and forming a layer comprising a mixture of a second liquid crystal different from said first liquid crystal and a transparent support material by mixing said second liquid crystal and a transparent support material and subsequently forming a film thereof and subsequently hardening said transparent support material. The first liquid crystal may have a threshold voltage different than the second liquid crystal.

What is claimed is:

1. An electro-optical device of a light scattering and non-scattering type comprising:
   a pair of electrode arrangements, at least one of which is transparent;
   an electro-optical modulating layer formed between said pair of electrode arrangements, said electro-optical modulating layer comprising a plurality of transparent support layers and a plurality of liquid crystal layers, the plurality of transport support layers alternating with the plurality of liquid crystal layers;
   wherein the transparent support layers are electrically insulated and the plurality of layers have an uneven light scattering roughened surface.

2. The device of claim 1 wherein the liquid crystal layer of one of the electro-optical modulating layers is different than the liquid crystal layer of another one of the electro-optical modulating layers.

3. The device of claim 1 wherein the thickness of each of said plurality of liquid crystal layers are 0.3 to 5 μm.

4. The device of claim 1 wherein the liquid crystal layer of one of said electro-optical modulating layers has a threshold voltage different than the liquid crystal layer of another one of said electro-optical modulating layers.

5. The device of claim 1 wherein said transparent support layer comprises an organic polymer.

6. An electro-optical device comprising:
   an electro-optical modulating layer comprising a plurality of laminated layers each comprising a mixture of a transparent support material and a liquid crystal, wherein each of the laminated layers has an uneven light scattering roughened surface.

7. The device of claim 6 wherein one of said plurality of layers comprise a liquid crystal different than another one of said plurality of layers.

8. The device of claim 6 wherein each of said plurality of laminated layers is directly laminated to and in contact with, an adjacent laminated layer along substantially an entire surface thereof.

9. The device of claim 6 wherein thickness of each of said plurality of layers is 0.3 to 5 μm.

10. The device of claim 6 wherein said electro-optical modulating layer is provided on an electrode provided on a substrate.

11. A method of forming an electro-optical device comprising the steps of:
    forming an uncured transparent support layer;
    forming a liquid crystal layer in direct contact with said uncured transparent support layer; and
    hardening said uncured transparent support layer to form a cured transparent support layer attached to said liquid crystal layer wherein said transparent support layer have an uneven roughened surface.

12. A method of forming an electro-optical device comprising:

forming a first uncured transparent support layer;
    forming a first liquid crystal layer in direct contact with said first uncured transparent support layer;
    hardening said first uncured transparent support layer to form a first cured transparent support layer attached to said first liquid crystal layer;
    forming a second uncured transparent support layer adjacent said first liquid crystal layer; and
    forming a second liquid crystal layer in direct contact with said second uncured transparent support layer, said first liquid crystal layer being positioned between said first cured transparent support layer and said second uncured transparent support layer.

13. A method of forming an electro-optical device comprising:
    forming a first layer comprising a mixture of a liquid crystal and a transparent support material and subsequently hardening said transparent support material; and
    repeating the forming and hardening step to form a plurality of subsequent layers on said first layer comprising a mixture of liquid crystal and hardened transparent support material,
    wherein said first layer and each of said subsequent layers have an uneven light scattering roughened surface.

14. A method of forming an electro-optical device comprising the steps of:
    forming a first layer of a first liquid crystal and a first transparent support material by forming a layer of said first liquid crystal and a layer of said first transparent support material and subsequently hardening said first transparent support material; and
    forming a second layer of a second liquid crystal different from said first liquid crystal and a second transparent support material by forming on said first layer a layer of said second liquid crystal and a layer of said second transparent support material and subsequently hardening said second transparent support material wherein said first liquid crystal layer is positioned between said first transparent support material and said second transparent support material.

15. The method of claim 14 wherein said first liquid crystal has a threshold voltage different than said second liquid crystal.

16. A method of forming an electro-optical device comprising the steps of:
    forming a first layer comprising a mixture of a first liquid crystal and a transparent support material by mixing said first liquid crystal and said transparent support material, subsequently forming a film thereof, and subsequently hardening said transparent support material; and
    forming a second layer comprising a mixture of a second liquid crystal different from said first liquid crystal and a transparent support material by mixing said second liquid crystal and said transparent support material and subsequently forming a film thereof on said first layer and subsequently hardening said transparent support material,
    wherein at least one of said first layer and said second layer has an uneven light scattering roughened surface.

17. The method of claim 16 wherein said first liquid crystal has a threshold voltage different than said second liquid crystal.

18. An electro-optical device of a light scattering and non-scattering type comprising:

a pair of electrode arrangements; at least one of which is transparent;

an electro-optical modulating layer formed between said pair of electrode arrangements, said electro-optical modulating layer comprising a plurality of transparent support layers and a plurality of liquid crystal layers, the plurality of transport support layers alternating with the plurality of liquid crystal layers;

wherein the transparent support layers are electrically insulated, and wherein one of said electro-optical modulating layers has a smectic phase liquid crystal layer and another one of said electro-optical modulating layers has a nematic phase liquid crystal layer.

* * * * *